(12) United States Patent
Pereira (10) Patent No.: US 9,329,605 B2
(45) Date of Patent: May 3, 2016

(54) NETWORK DEVICE HEATING BASED ON POWER CLASSIFICATION AND TEMPERATURE

(75) Inventor: Louis E. Pereira, Assonet, MA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 972 days.

(21) Appl. No.: 13/295,599

(22) Filed: Nov. 14, 2011

(65) Prior Publication Data

US 2013/0123999 A1    May 16, 2013

(51) Int. Cl.
*G05D 23/19* (2006.01)

(52) U.S. Cl.
CPC .................................. *G05D 23/1924* (2013.01)

(58) Field of Classification Search
None
See application file for complete search history.

(56) References Cited

U.S. PATENT DOCUMENTS

| | | | |
|---|---|---|---|
| 5,175,845 A | 12/1992 | Little | |
| 5,483,656 A * | 1/1996 | Oprescu et al. | 713/320 |
| 6,531,899 B1 * | 3/2003 | Male | 327/100 |
| 7,593,747 B1 | 9/2009 | Karam et al. | |
| 7,644,295 B1 | 1/2010 | Dotson et al. | |
| 7,996,698 B2 | 8/2011 | Nguyen et al. | |
| 8,266,463 B2 * | 9/2012 | Jonnala et al. | 713/300 |
| 2006/0092000 A1 * | 5/2006 | Karam et al. | 340/310.11 |
| 2006/0143488 A1 * | 6/2006 | Peleg et al. | 713/330 |
| 2006/0164774 A1 * | 7/2006 | Herbold et al. | 361/93.1 |
| 2006/0212724 A1 * | 9/2006 | Dwelley | H04L 12/10 713/300 |
| 2006/0288949 A1 | 12/2006 | Axinte et al. | |
| 2007/0135086 A1 * | 6/2007 | Stanford | 455/402 |
| 2007/0296391 A1 * | 12/2007 | Bertin et al. | 323/303 |
| 2008/0136653 A1 * | 6/2008 | Owens | 340/636.1 |
| 2008/0229120 A1 * | 9/2008 | Diab | 713/300 |
| 2009/0100275 A1 * | 4/2009 | Chang et al. | 713/300 |
| 2009/0327766 A1 * | 12/2009 | Ghoshal et al. | 713/300 |
| 2010/0053222 A1 | 3/2010 | Kerofsky | |
| 2011/0258465 A1 * | 10/2011 | Diab et al. | 713/300 |
| 2011/0320832 A1 * | 12/2011 | Boss et al. | 713/300 |
| 2012/0050000 A1 * | 3/2012 | Melvin et al. | 340/3.1 |
| 2012/0120306 A1 * | 5/2012 | Schindler et al. | 700/296 |
| 2012/0319468 A1 * | 12/2012 | Schneider et al. | 307/1 |
| 2013/0339765 A1 * | 12/2013 | Diab | 713/300 |

FOREIGN PATENT DOCUMENTS

WO    WO 2011116258 A1 *  9/2011
WO    WO 2013032455 A1 *  3/2013

OTHER PUBLICATIONS

Berger et al., "Power Ethernet MIB", RFC 3621, Dec. 2003.*
Blaut et al. "Providing Maximum Power for Power Over Ethernet Over Operating Temperature Range" IP.com No. IPCOM000198558D IP.com Electronic Publication: Aug. 9, 2010.*

* cited by examiner

*Primary Examiner* — Ryan Jarrett
(74) *Attorney, Agent, or Firm* — Hewlett Packard Enterprise Patent Department (57) ABSTRACT

Example embodiments disclosed herein relate to network device heating based on power classification and temperature. The network device may be configured to receive power via a network connector. The received power can be associated with a power classification. Temperature associated with the network device can be determined. Heat can be produced based on the power classification and the determined temperature.

10 Claims, 4 Drawing Sheets

NETWORK DEVICE HEATING BASED ON POWER CLASSIFICATION AND TEMPERATURE

BACKGROUND

Computing systems today are connected via various networks, for example wired networks such as Ethernet. As these networks have developed, devices have been developed that are capable of being powered via these network connections. The Institute of Electrical and Electronics Engineers (IEEE) has developed the IEEE 802.3af and 802.3at standards that define Power over Ethernet. Power over Ethernet systems involve delivering power from a Power Sourcing Equipment (PSE) to a Powered Device (PD) located at an opposite end of a network connection. These devices can be placed in various locations and/or thermal environments.

BRIEF DESCRIPTION OF THE DRAWINGS

The following detailed description references the drawings, wherein.

DETAILED DESCRIPTION

Increasingly, more and more types of devices are being developed to run as devices powered by network connections. Power can be provided from power sourcing equipment (PSE) to powered devices (PDs) via network connections. For example, powered devices, such as Internet Protocol (IP) cameras, IP card readers, IP phones, wireless access points, etc., are being added to networks and consuming power through network connections. Some of these PDs can be used in varying environmental conditions. For example, some PDs may be used outdoors and/or otherwise be subject to harsh environments.

Powered devices are devices that are capable of being powered by power sourcing equipment. In certain embodiments, PSEs and PDs can conform to a standard or specification. In certain examples, a standard and/or specification is a set of rules that devices should and/or shall follow in a power over network system. In some embodiments, the PDs and/or PSEs follow a standard by the Institute of Electrical and Electronics Engineers (IEEE) such as the IEEE 802.3af and/or IEEE 802.3at standards providing specifications to implement Power over Ethernet (PoE). In other embodiments, the PSEs and PDs described herein may conform to another specification or approach.

Power characteristics of PDs can vary based on classes. For example, IEEE 802.3af and 802.3at provide for classes of PDs. In the 802.3af specification, Class 0 provides for a power allocation of 12.95 W, Class 1 provides for a power allocation of 3.84 W, Class 2 provides for a power allocation of 6.49 W, and Class 3 provides for a power allocation of 12.95 W. The 802.3at specification adds Class 4, which provides for a power allocation of 25.5 W. These examples relate to the power available at the PD. In certain examples, the allocation values can be considered the maximum values of average power over a time range (e.g., 1 second). In the case of other standards or specifications, for example, proprietary standards/specifications, other ranges and/or power levels can be used. As such, PDs can be classified in a group that can expect a certain amount of power available from a PSE providing power.

Components making up a PD may be rated for particular temperatures. For example, a chip and/or sensor may be rated to work properly at a certain temperature range. Other components can be rated to work properly at other temperature ranges. Examples of components include chips, circuitry, displays, antennae, radios, moving parts, and sensors such as image capture sensors, accelerometers, position sensors, temperature sensors, etc. If temperatures go outside of the respective ranges, for example, below a threshold temperature, one or more of the components may fail or work improperly.

Temperature control mechanisms can be used to regulate a temperature of the PD or near a part of the PD. However, these temperature control mechanisms (e.g., using a heating element) may cause the PD to consume more power than a PSE powering the PD supports. Accordingly, various embodiments disclosed herein relate to selectively controlling thermal elements to regulate the temperature of the PD based on the amount of power available from the PSE and a temperature sensed by a sensor of the PD. The amount of power available from the PSE can be based on the classification. In certain examples, the PD can determine, based on the classification, whether the PD can expect to be supplied with enough power to utilize thermal elements. As such, a thermal monitoring circuit and/or a heating module can be enabled to allow for thermal regulation.

Controlling the use of the thermal elements (e.g., a heater) based on the power classification of power available to the PD allows for manufacturers and consumers to have options built into the PD. Further, a consumer need not be required to enable and/or disable thermal features during installation of the PD based on the PSE that the PD is connected to. For example, the PSE that a particular customer may have may correspond to the 802.11 af specification, in which the PD has a maximum power expectation of 12.95 watts. In one example, if normal functionality of the PD consumes 7 watts and a heating module consumes more than 5.95 watts, the PD would have insufficient power to use the heating module. As such, the PD can disable the heating module. In another example, the same PD is connected to a PSE that is capable of delivering and is expected to be able to deliver 25.5 watts of power to the PD. The PD can enable the heating module.

Further, the activation of the heating module or other thermal elements can be based on a temperature reading of a sensor of the PD. Temperature sensing circuitry can further be enabled and/or disabled based on the power class. In one example, the heating module is activated if the sensed temperature meets and/or goes below a threshold value. The heating module can be activated until the PD reaches another threshold value. With this approach, the PD can efficiently use power based on need.

Figure 1:
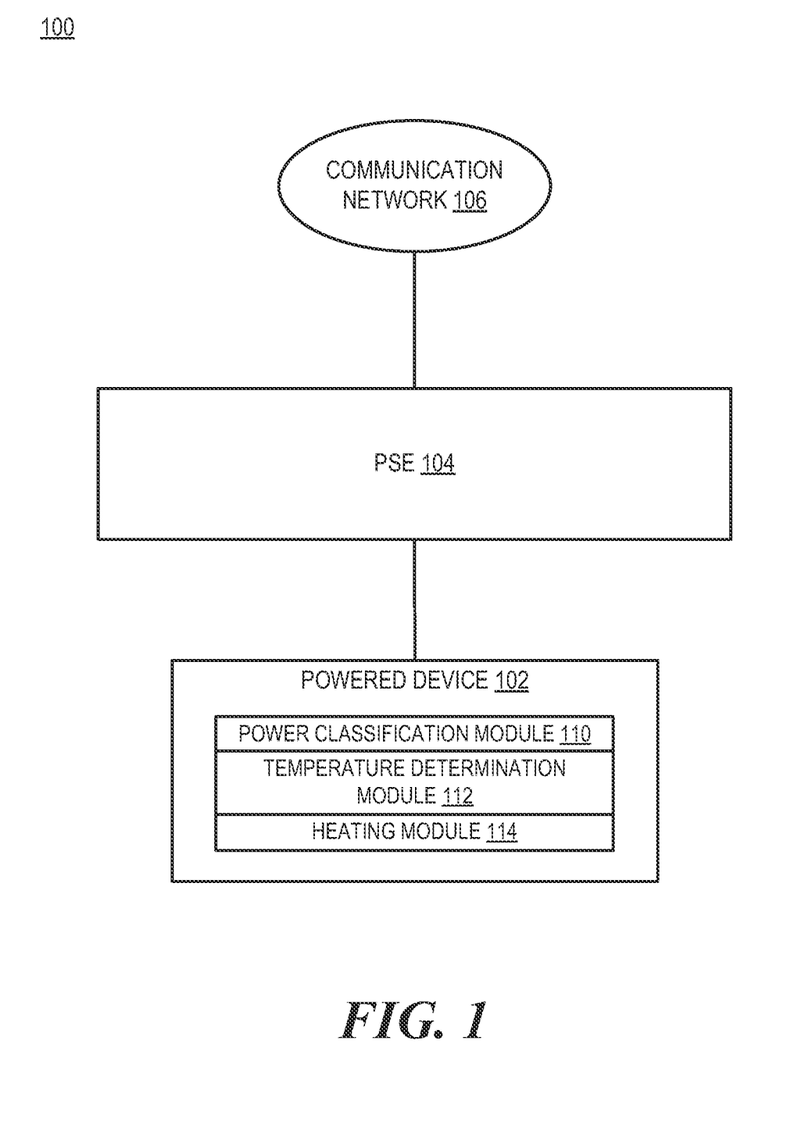
FIG. 1 is a block diagram of a system for selectively heating a network device powered via a network connection, according to one example.

FIG. 1 is a block diagram of a system for selectively heating a network device powered via a network connection, according to one example. The system 100 can include a powered device 102 that is connected to power sourcing equipment 104. Further, the powered device 102 can communicate with other devices via the PSE 104 and communication network 106.

In certain examples, PSEs such as PSE 104 are network devices (e.g., switches, midspans, etc.) that are capable of providing power over a network connection (e.g., according to a PoE standard proprietary system, etc.). Further, in some examples, PD 102 is a device capable of being powered by a network connection (e.g., via power sourcing equipment such as PSE 104). As noted, the power reception can be based on a standard or specification, such as a PoE standard or proprietary specification.

In certain examples, the PD 102 and/or other devices are computing devices, such as client computers, tablet devices, mobile computers, etc. In other embodiments, the PD 102 can be a special purpose machine such as a media player, a routing device, a communication device such as an IP telephone, an access point, sensing equipment, input/output equipment, etc. Further, the PD 102 can include a power classification module 110, a temperature determination module 112, and a heating module 114. The PD 102 can be implemented via a processing element, memory, and/or other components.

The PD 102 can provide a primary function. For example, the PD 102 may provide the primary functions of a wireless access point to the network. The PD 102 can have components used to implement the primary function. Further, the PD 102 can include components and/or modules for regulating temperature, for example, the power classification module 110, the temperature determination module 112, and the heating module 114. The PD 102 can be placed in an environment in which the temperature may go below a threshold temperature. The threshold temperature can be set by a manufacturer of the PD 102 or other user of the PD 102. In certain examples, the threshold temperature can be set based on components used in the PD 102. For example, the threshold temperature can be determined to ensure that the temperature of the PD 102 is above a temperature associated with one of the components. The temperature could be, for example, a temperature at which the component is tested to function properly at. Further, the temperature threshold can be above the associated temperatures tested with the components. Because the heating module 114 can be used, the temperature toleration of the PD 102 as a whole can be increased.

However, as noted above, the PD 102 may not receive sufficient power from the PSE 104 to power the heating module 114. As such, the PD 102 can selectively use the heating module 114 based on a power classification of the network power supplied by the PSE 104. The power classification module 110 can be used to determine the classification of the power provided by the PSE 104 as further detailed in FIGS. 2A and 2B. Based on the classification, the PD 102 can enable or disable the use of the temperature determination module 112 and/or the heating module 114. Further, the classification can be used to determine whether to activate the heating module 114. Additionally, the activation of the heating module 114 can be based on a temperature determined by the temperature determination module 112 as further detailed below.

The communication network 106 can use wired communications, wireless communications, or combinations thereof. Further, the communication network 106 can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like.

In certain examples, wireless networks may include cellular networks, satellite communications, wireless LANs, etc. Further, the communication network 106 can be in the form of a direct network link between devices. Various communications structures and infrastructure can be utilized to implement the communication network(s). Moreover, in certain examples, the PD 102 can be a network element such as an access point to provide access to the communication network 106 to other devices and/or to connect to other communication networks.

By way of example, the PD 102 and other devices communicate with each other and other components with access to the communication network 106 via a communication protocol or multiple protocols. A protocol can be a set of rules that defines how nodes of the communication network 106 interact with other nodes. Further, communications between network nodes can be implemented by exchanging discrete packets of data or sending messages. Packets can include header information associated with a protocol (e.g., information on the location of the network node(s) to contact) as well as payload information.

In certain scenarios, an Ethernet cable (e.g., a Category (CAT) 3 cable, a CAT 5 cable, etc.) can be used to connect the PSE 104 to the PD 102 and/or other network elements. The Ethernet cable can carry both power and communications. Different cables can have different resistances and/or lengths. As such, using one cable instead of another can change the amount of power available at a PD 102. Also, because of this, power delivered to the PD 102 may be different than the power allotted to the PD 102 at the PSE 104. For example, a Class 3 PD can expect 12.95 W of power from the PSE 104, but the PSE 104 may need to allocate a greater amount of power, for example, 15.4 W of power to guarantee the 12.95 W of power to the PD 102.

As the PD 102 connects to the PSE 104, the PSE 104 negotiates with and allocates an amount of power for the PD 102. The PSE 104 can search for PoE enabled PDs using a detection mechanism. For example, the PSE 104 can apply a voltage ramp to a PD 102 and look for a characteristic impedance from a load. In certain scenarios, the load can be within a particular range, for example, a 25 kΩ load. The PD 102 can provide the load. If the impedance is not detected, the PSE 104 can assume that a connected device is not a compatible powered device and does not provide power to the connected device. As such, the connection can be operated as a standard Ethernet connection. If the impedance is detected, the PSE 104 can move to a classification phase. In one example, the detection phase voltage ramp for IEEE 802.3 devices is between 2.5V and 10V.

In certain examples, the PD 102 can identify itself as a particular class of device. This can be, for example, a class that consumes additional power, such as an IEEE 802.3at Class 4 device. If the PSE 104 supports and provides the power, the PD 102 can enable use of the heating module 114. If the PSE 104 does not support or does not provide the requested power, the PD 102 can disable or inactivate the heating module 114. In some examples, the PD 102 knows the power classification based on what the PD 102 presents itself as during negotiation for power that is received. In other examples, the power classification module 110 can communicate with the PSE 104 after power is supplied to determine the class and/or amount of power to expect the PSE 104 to provide to the PD 102.

Figure 2A:
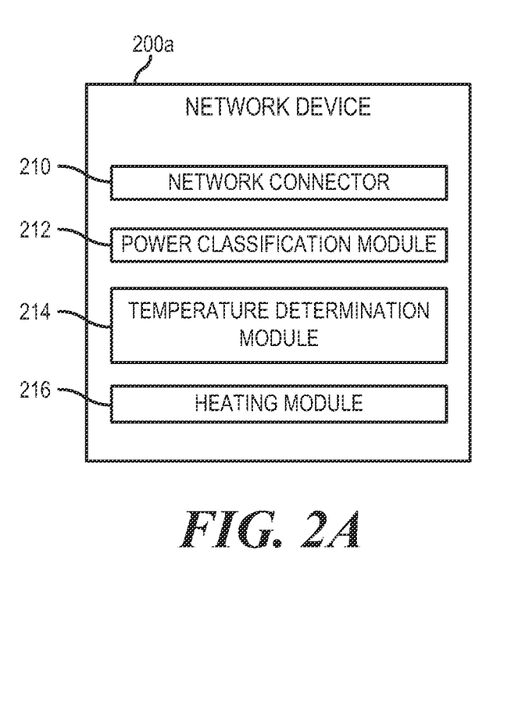
FIGS. 2A and 2B are block diagrams of network devices capable of being selectively heated, according to various examples.
Figure 2B:
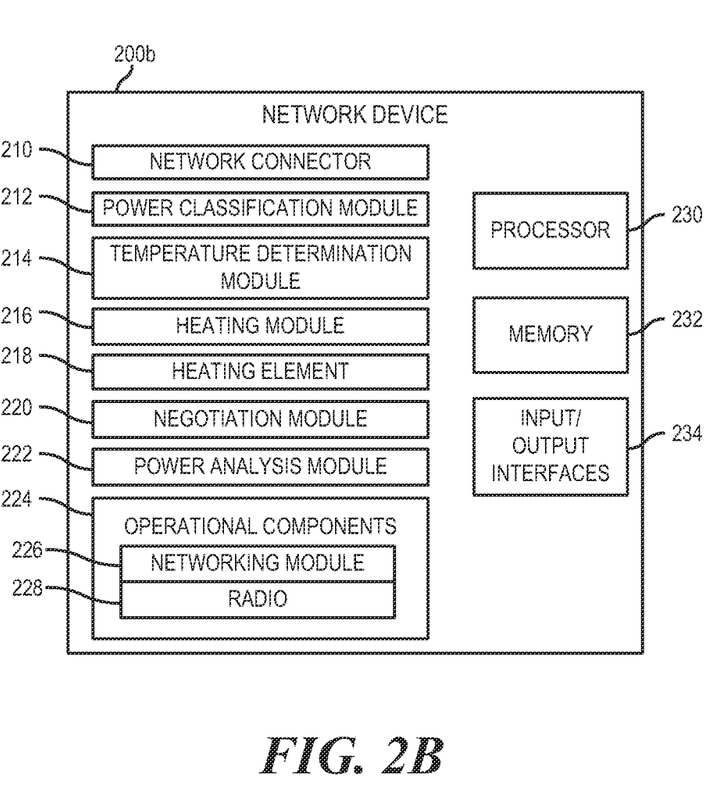

FIGS. 2A and 2B are block diagrams of network devices capable of being selectively heated, according to various examples. Network devices 200a, 200b include components that can be used to selectively heat the respective network devices 200a, 200b and/or other areas. The respective devices 200a, 200b may be a computing device, an access point, a router, an IP camera, or any other computing device that is capable of producing heat based on a power classification and a temperature sensor. A network device 200a may include a network connector 210, a power classification module 212, a temperature determination module 214, and a heating module 216. Further, a network device 200b may further include a heating element 218, a negotiation module 220, a power analysis module 222, and operational components such as a networking module 226 and a radio 228. Moreover, the network device 200b may include a processor 230, memory 232, and input/output interfaces 234 to implement functionality.

The network device 200 can include a physical network connector 210 that can provide power and communications to the network device 200. The network connector 210 can provide, via a connection to a PSE or other network element, the network device 200 with communication information from outside of the network device 200. Further, the network connector 210 can provide the network device 200 with power from the PSE. As noted, this can be implemented using one or more standards or specifications, for example, PoE standards.

A power classification module 212 can be used to determine a power classification associated with the power provided via the network connector 210. The power classification can be based on a determination of a type of standard a PSE providing the power supports. For example, the network device 200 can be compatible with multiple power over network connection standards (e.g., IEEE 802.3af and 802.3at). A negotiation module 220 of the network device 200 can negotiate for power with the PSE. As such, the negotiation module 220 can represent the network device 200 as a first type or class of device and if the network device 200 fails to receive power based on that representation, the negotiation module 220 can represent itself as a second type or class of device. As such, the power classification module 212 can determine the class of power received from the PSE based on the class and/or type of device represented when power was received. Further, the power classification module 212 may be capable of and caused to request and receive the power class information from the PSE, for example, by using a Link Layer Discovery Protocol. In certain examples, the class can be based on what type of PSE is providing the power. In other examples, the class can be based on the amount of power the network device 200 can expect to receive. The class can be used to determine to enable and/or use a heating module 216 as discussed below.

The class can also be used to determine to enable or use a temperature determination module 214. The temperature determination module 214 can be used to determine one or more temperatures associated with the network device 200. Further, the temperature(s) can be collected from one or more temperature sensors. The temperature sensor(s) can be located in or around the network device 200. Using the power classification to enable the temperature determination module 214 can be used to save additional power consumption costs if the heating module 216 is not used.

The heating module 216 can be caused to produce heat based on the power and a temperature sensed by the temperature determination module 214. The heating module 216 can activate a heating element 218 to provide heat. In certain examples, the heating element 218 can be part of the heating module 216. In certain embodiments, a heating element converts electricity into heat, for example, by using Joule heating. Examples of heating elements include resistance wire, etched foil, heat lamps, Positive Thermal Coefficient ceramics, thick film technology, etc. The heating module 216 can control the heating element 218 to provide heat if the temperature sensed is at or below a threshold level. The temperature sensed can be a raw value or processed (e.g., an average temperature over time). The use of the heating module 216 and/or heating element 218 can also be based on the power classification. For example, the heating module 216 can be used if the power classification indicates that the power available to the network device 200 is sufficient to operate the heating element. In one example, the heating module 216 can be disabled if the power classification indicates that the power supplied by the PSE via the network connector 210 is below a particular level or threshold. The threshold can be preset or be based on a power analysis module 222. In certain examples, an enclosure or packaging can be around the network device 200. The enclosure can be part of the network device 200 and be used to help regulate temperature. For example, the enclosure may be insulated and/or include ventilation.

Operational components 224 of the network device 200 can be used to provide a function. The operational components 224 can be considered the components used to perform the primary function of the device. Examples of functions include networking functions, routing functions, sensing functions (e.g., camera sensing), storage functions, or the like. In one example, the network device 200 can be a wireless access point that includes a networking module 226 to process information and communicate with the PSE and/or other devices and a radio 228 to wirelessly connect to devices such as other network elements, client devices, etc. Other operational components 224 can be used for other types of network devices 200. These operational components 224 can consume energy. Further, some of these operational components 224 can be activated independently of the heating module 216. For example, the operational components 224 can be enabled independently of the heating module 216, temperature determination module 214, heating element, or a combination thereof.

The power analysis module 222 can be used to determine whether the power classification indicates that the power available to the network device 200 from the PSE is sufficient to operate the heating element and/or the heating module 216. As such, the power analysis module 222 can determine a power budget based on the power classification. The power budget can be based on the amount of power the network device 200 can expect from the PSE. For example, an 802.3at Class 4 device can expect to receive 25.5 watts of power. As such, the power budget can be the amount of power the network device 200 can expect based on the power classification.

The power analysis module 222 can also determine a power usage allotment for the operational components 224. This information can be based on an amount of power being consumed by the operational components or based on power allotment information stored in memory 232. The power allotment information can be determined by a manufacturer of the network device 200 and/or be adjusted by a customer. Further, the power allotment information can be a power usage level greater than an expected amount of power usage consumed by the operational components 224.

Moreover, the power analysis module 222 can further determine a power cost allocation for the heating module 216. The power cost allocation can also be based on an expected amount of power usage of the heating module 216 and/or heating element. The determination of the power cost allocation can be based on power consumption information about the heating module 216 stored in the memory 232. As such, the activation of the heating module 216 and/or heating element 218 can be based, at least in part, on whether the power budget is at least equal to the power usage allotment and the power cost allotment. If there is enough power to use both, the heating module 216 can be enabled. Further, as noted above, the use of the heating module 216 can also be controlled by a sensed temperature.

A processor 230, such as a central processing unit (CPU) or a microprocessor suitable for retrieval and execution of instructions and/or electronic circuits can be configured to perform the functionality of any of the modules 212-228 described herein. In certain scenarios, instructions and/or other information, such as temperature information or power classification information, can be included in memory 232 or other memory. Input/output interfaces may additionally be provided by the network device 200. For example, input devices, such as a keyboard, a sensor, a touch interface, a mouse, a microphone, etc. can be utilized to receive input from an environment surrounding the network device 200b. Further, an output device, such as a display, can be utilized to present information to users. Examples of output devices include speakers, display devices, amplifiers, etc. Moreover, in certain embodiments, some components can be utilized to implement functionality of other components described herein.

Each of the modules 212-228 may include, for example, hardware devices including electronic circuitry for implementing the functionality described herein. In addition or as an alternative, each module 212-228 may be implemented as a series of instructions encoded on a machine-readable storage medium of network device 200 and executable by processor 230. It should be noted that, in some embodiments, some modules are implemented as hardware devices, while other modules are implemented as executable instructions.

The negotiation module 220 can be used to negotiate for power from a PSE connected via the network connector 210. In certain examples, the negotiation module 220 can be implemented via circuitry. Circuitry can include one or more transistors, resistors, capacitors, diodes, or combinations thereof to implement. Further, logic can be used in conjunction with the circuitry to implement the negotiation module 220.

In one example, the network powered device 200 presents itself to a PSE using a 25 kΩ load at a first voltage ramp up range (e.g., between 2.5V and 10V) to indicate that the network device 200 is compatible. The ramp up range can be controlled by the PSE. Then, at a second ramp up range, for example, between 15V and 20V, the negotiation module 220 can present the network device 200 as another load. The other load can be used to classify the network device 200 by the PSE. An under voltage lockout circuit or multiple under voltage lockout circuits can be used to control what is presented to the PSE at different voltage levels. In certain examples, under voltage lockout circuits and a pass-switch can be used to enable PoE circuitry during the ramp up period and then other system functionality if the PSE provides additional power (e.g., if the PSE applies a voltage over 30V). In other examples, other negotiation methods can be used.

Figure 3:
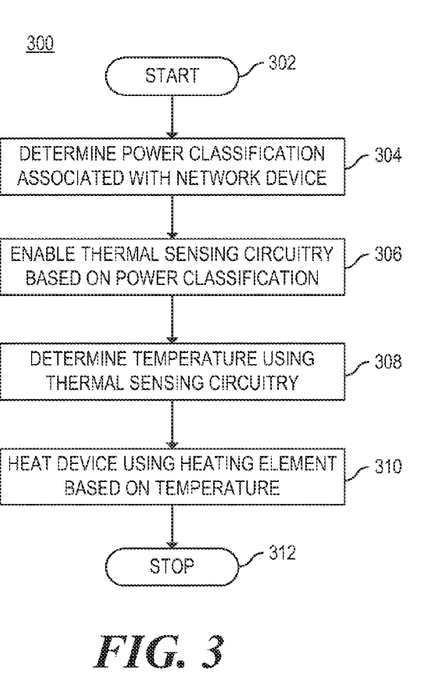
FIG. 3 is a flowchart of a method for heating a powered device based on temperature and a power classification of network power associated with the powered device, according to one example.

FIG. 3 is a flowchart of a method for heating a network powered device based on temperature and a power classification of network power associated with the powered device, according to one example. Although execution of method 300 is described below with reference to network device 200, other suitable components for execution of method 300 can be utilized (e.g., powered device 102, device 500, etc.). Additionally, the components for executing the method 300 may be spread among modules, circuit boards, etc. Method 300 may be implemented in the form of executable instructions stored on a machine-readable storage medium and/or in the form of electronic circuitry.

Method 300 may start at 302, where the network device 200 can be in an environment in which it may be beneficial to regulate the temperature of the network device 200. Such an environment may be, for example, an outdoor environment or an environment without insulation. In certain examples, the environment may be cold. As such, it may be advantageous to regulate the temperature of the network device 200. However, as noted above, the network device 200 may have insufficient power to heat the network device 200.

Method 300 can proceed to 304, where a power classification module 212 of the network device 200 determines a power classification associated with power received via a network connection. In certain examples, the power is received through a network connector 210 of the network device 200. The network connector 210 can be connected via one or more wires, for example, an Ethernet cable, to a PSE that can provide the network device 200 with communications capabilities as well as power. As noted above, the power provided to the network device 200 can be associated with a power classification or category. The power classification can be associated with an amount of power that the network device 200 can expect to receive from the PSE. This power amount need not be used, but can be considered a power level that the PSE will allocate for/provide to the network device 200.

The power classification can be used to control a heating module 216. Thus, if the power classification indicates that insufficient power is allocated by the PSE to use the heating module 216, use of the heating module 216 can be disabled. At 306, the network device 200 can enable thermal sensing circuitry of the network device 200 based on the power classification. The thermal sensing circuitry can be implemented in the form of a temperature determination module 214. In one example, a signal can be sent from a processor 230 to enable use of the temperature determination module 214. The signal can be a reset signal to stop operation of the circuitry, a signal controlling power to the circuitry, or the like. The network device 200 can save power consumption by disabling the thermal sensing circuitry when the heating module 216 would not be used. As such, circuitry controlling the heating module 216 and/or a heating element 218 can be enabled based on the power classification. A similar signal from the processor 230 can be used to enable the heating module 216 based on the power classification.

At 308, the thermal sensing circuitry can be used to determine a temperature via a sensor. The temperature can be based on a raw value received from a temperature sensor. Further, the temperature can be processed, for example, by taking an average and/or filtering outlying results.

The network device 200 can be heated using the heating element 218 based on the temperature (at 310). This can also be based on the power classification because the power classification is used to enable the thermal sensing circuitry. The sensed temperature can be compared to a threshold value. In one example, if the sensed temperature is less than the threshold value and/or equal to the threshold value, the heating element 218 is used for heating. This can occur by applying current through the heating element 218. The sensing circuitry can continue to monitor the temperature of the network device 200. In some examples, the heating element 218 can be used to generate heat until the monitored temperature hits a second threshold. As such, hysteresis can be used to control the temperature. This can provide additional power usage savings. Then, at 312, the method 300 stops. Other processes of the network device 200 can continue. For example, the network device 200 can continue its normal operation and/or temperature monitoring.

Figure 4:
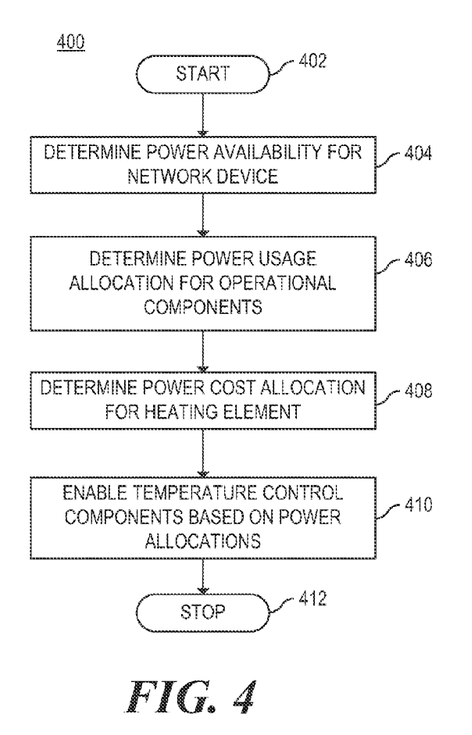
FIG. 4 is a flowchart of a method for enabling temperature control components based on power information, according to one example.

FIG. 4 is a flowchart of a method for enabling temperature control components based on power information, according to one example. Although execution of method 400 is described below with reference to network device 200, other suitable components for execution of method 400 can be utilized (e.g., powered device 102, device 500, etc.). Additionally, the components for executing the method 400 may be spread among modules, circuit boards, etc. Method 400 may be implemented in the form of executable instructions stored on a machine-readable storage medium and/or in the form of electronic circuitry.

Method 400 can start at 402, where the network device 200 can be in an environment where it can be advantageous to heat the network device 200 and/or other components or devices using a heating module 216 as in method 300. The determinations of enabling the thermal sensing circuitry and/or heating module 216 can be based on an analysis of power information.

At 404, a power analysis module 222 can determine power availability for the network device based on a power classification. As noted above, the power classification can be based on a status of the network device 200 when power is received from a PSE and/or based on communications with the PSE. Power availability for the network device 200 can be based on a table stored in memory 232. As such, each classification can be associated with a power level that the network device 200 can expect to be able to draw from the PSE. This table can be based on a standard, proprietary specification, etc. For example, an 802.3af powered device may expect 3.84 watts of power at Class 1, 6.49 watts at Class 2, and/or 12.95 watts at Class 3. Further, an 802.3at powered device may expect 25.5 watts of power at Class 4.

The power analysis module 222 can, at 406, determine a power usage allocation for a set of operational components 224 of the network device 200. The power usage allocation can be based on sensors determining actual use of the network device 200 and/or based on power estimates and/or ratings. For example, the power usage allocation can be a set value at manufacturing. This can be based on testing. Further, the power usage allocation may be changeable by a user. Moreover, at 408, the power analysis module 222 can determine a power cost allocation for the heating element 218. This can be based on a power rating of the heating element 218, a value set at manufacturing, a variable that can change based on a power setting of the heating element 218 (e.g., a low power setting may use less power than a high power setting), or the like.

The power availability can be compared with the power usage allocation of the operational components 224 and the power cost allocation of the heating element 218. At 410, the thermal sensing circuitry, heating module 216, and/or heating element 218 can be enabled based on the power availability, the power usage allocation and the power cost allocation. For example, if sufficient power is leftover from the power availability after the power usage allocation is accounted for to use the heating element 218, the thermal circuitry, heating module 216, heating element 218, or a combination thereof can be enabled. The temperature can also be taken into account for actual control of the heating element 218. Then, at 412, the method 400 stops. The network device 200 can continue to perform other processes, for example, operational functions.

Figure 5:
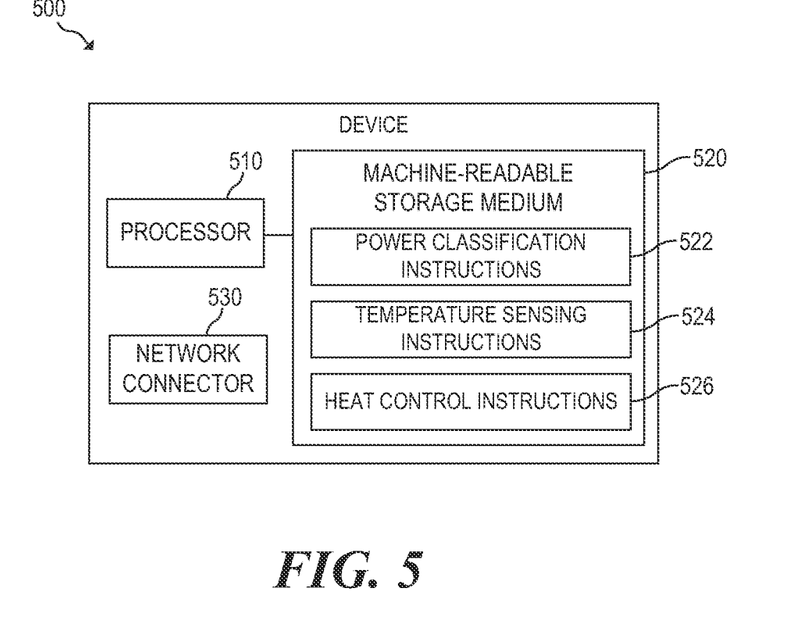
FIG. 5 is a block diagram of a device capable of selectively controlling temperature, according to one example.

FIG. 5 is a block diagram of a device capable of selectively controlling temperature, according to one example. The device 500 includes, for example, a processor 510, and a machine-readable storage medium 520 including instructions 522, 524, 526 for controlling a heat element. Device 500 may be, for example, an access point, an IP camera, an IP telephone, an IP sensing device, or any other computing device capable of being powered over a network connection and able to control a heating element.

Processor 510 may be, at least one central processing unit (CPU), at least one semiconductor-based microprocessor, at least one graphics processing unit (GPU), other hardware devices suitable for retrieval and execution of instructions stored in machine-readable storage medium 520, or combinations thereof. For example, the processor 510 may include multiple cores on a chip, include multiple cores across multiple chips, or combinations thereof. Processor 510 may fetch, decode, and execute instructions 522, 524, 526 to implement tasks performed in methods 300 and 400. As an alternative or in addition to retrieving and executing instructions, processor 510 may include at least one integrated circuit (IC), other control logic, other electronic circuits, or combinations thereof that include a number of electronic components for performing the functionality of instructions 522, 524, 526.

Machine-readable storage medium 520 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 520 may be encoded with a series of executable instructions for selectively controlling a heat element.

As with network device 200, power and communications for the device 500 can be provided to the device 500 via a network connector 530. Power classification instructions 522 can be executed by the processor 510 to determine a power classification associated with power availability through the network connector 530. The power classification can be based on a communication with the PSE via the network connector 530 or via other methods, for example, based on a negotiation for power between the device 500 and the PSE.

Temperature sensing instructions 524 can be executed on the processor 510 to determine a temperature from a sensor of the device 500. For example, the processor can receive information from a temperature sensor regarding the temperature at the sensor. The processor 510 can store this information in memory. Moreover, the processor 510 may process received raw temperature readings (e.g., an integer value) into a usable temperature. Further processing can also be performed, for example, by using an average of multiple sensor readings.

Heat control instructions 526 may be executed by the processor 510 to control a heating element based on the power classification and a determination that the temperature is below a set temperature threshold. The heating element can be used to heat the device 500 or another area that can affect the temperature sensed. In certain examples, multiple heating elements and/or multiple temperature sensors can be used.

In some examples, the heat is controlled, at least in part, by determining a power usage allocation of one or more operational components of the network device and determining a power cost allocation for the heating element. In certain scenarios, the allocations, when combined, can represent the total power consumption of the device. The total power consumption, the power cost allocation, and the power usage allocation can each be estimates or set values. As such, in certain scenarios, the power cost allocation can be a power value cost associated with usage of the heating element, and the power usage allocation can represent the power usage of the rest of the device 500. The activation of the heating element can be based on whether the power availability is at least equal to the power usage allocation and the power cost allocation. This can be determined if the power availability is greater than or equal to the power usage allocation plus the power cost allocation.

Further, as noted above, heating circuitry and/or temperature sensing circuitry can be enabled or disabled based on whether the power availability is greater than or equal to the power usage allocation plus the power cost allocation. This can produce savings in the energy used by the device 500. Moreover, this can allow the device 500 to be connected to varying PSEs that may be able to provide varying amounts of power. Heating elements can be used based on the availability of power as well as need based on a temperature reading.

What is claimed is:

1. A network device comprising:
a network connector configured to provide power to the network device;
a power classification module to determine a power classification associated with the power provided via the network connector, wherein the power classification is based on a determination that a power sourcing equipment supports a power over network standard;
a temperature determination module to determine a temperature associated with the network device; and
a heating module to produce heat based on the power classification and the temperature.

2. The network device of claim 1, further comprising:
a negotiation module to negotiate for the power classification from a power sourcing equipment,
wherein the power is received from the power sourcing equipment.

3. The network device of claim 1, wherein the heating module controls a heating element to provide the heat if the temperature is below a threshold level and the power classification indicates that the power available to the network device is sufficient to operate the heating element.

4. The network device of claim 3, further comprising:
a networking module to communicate with a power sourcing equipment; and
a radio to communicate with another device,
wherein the networking module and the radio are activated independently of the heating module.

5. The network device of claim 1, further comprising:
a power analysis module to:
determine a power budget based on the power classification,
determine a power usage allotment for operational components of the network device, and
determine a power cost allocation of the heating module,
wherein activation of the heating module is further based on whether the power budget is at least equal to the power usage allotment and the power cost allocation.

6. The network device of claim 1, wherein the heating module is disabled if the power classification indicates that the power supplied by a power sourcing equipment via the network connector is below a threshold.

7. A non-transitory machine-readable storage medium storing instructions that, if executed by at least one processor of a device, cause the at least one processor to:
determine a power classification associated with power availability through a network connector configured to provide power to the device, wherein the power classification is based on a determination that a power sourcing equipment supports a power over network standard;
determine a temperature from a sensor of the device; and
control a heating element to produce heat based on the power classification and a determination that the temperature is below a temperature threshold.

8. The non-transitory machine-readable storage medium of claim 7, further comprising instructions that, if executed by the at least one processor, cause the at least one processor to:
determine a power usage allocation for one or more operational components of the device; and
determine a power cost allocation for the heating element,
wherein activation of the heating element is further based on whether the power availability is at least equal to the power usage allocation and the power cost allocation.

9. The non-transitory machine-readable storage medium of claim 8, wherein a total power consumption allocation of the device consists of the power usage allocation and the power cost allocation.

10. The non-transitory machine-readable storage medium of claim 8, further comprising instructions that, if executed by the at least one processor, cause the at least one processor to:
enable determination of the temperature based on whether the power availability is at least equal to the power usage allocation and the power cost allocation.

* * * * *